United States Patent [19]

Uchida et al.

[11] Patent Number: 5,057,574

[45] Date of Patent: Oct. 15, 1991

[54] PROCESS FOR PRODUCING AN ALPHA-ALKYL-SUBSTITUTED AROMATIC VINYL COPOLYMER AND A THERMOPLASTIC RESIN COMPOSITION COMPRISING THE COPOLYMER

[75] Inventors: Makoto Uchida; Yutaka Toyooka, both of Otake; Kazuo Kishida, Hiroshima; Akira Nakata, Otake; Naoki Yamamoto, Hiroshima, all of Japan

[73] Assignee: Mitsubishi Rayon Company, Ltd., Tokyo, Japan

[21] Appl. No.: 523,269

[22] Filed: May 14, 1990

Related U.S. Application Data

[63] Continuation of Ser. No. 204,972, Jun. 3, 1988, abandoned, which is a continuation of Ser. No. 812,895, Dec. 23, 1985, abandoned.

[30] Foreign Application Priority Data

Dec. 28, 1984 [JP] Japan .............................. 59-274476
Dec. 28, 1984 [JP] Japan .............................. 59-274477

[51] Int. Cl.$^5$ .......................................... C08L 51/04
[52] U.S. Cl. ................................... 525/85; 525/75; 525/77; 525/78; 526/328; 526/342; 526/346
[58] Field of Search ......................................... 525/85

[56] References Cited

U.S. PATENT DOCUMENTS 4,294,946 10/1981 Minematsu et al. .................. 525/80

FOREIGN PATENT DOCUMENTS 0041703 12/1981 European Pat. Off. .
0042572 12/1981 European Pat. Off. .
0164874 12/1985 European Pat. Off. :

*Primary Examiner*—Jacob Ziegler
*Attorney, Agent, or Firm*—Oblon, Spivak, McClelland, Maier & Neustadt

[57] ABSTRACT

A process for producing an α-alkyl-substituted aromatic vinyl copolymer constituted of 60 to 85 parts by weight of the α-alkyl-substituted aromatic vinyl monomer, 15 to 35 parts by weight of a vinyl cyanide monomer, and 0 to 40 parts by weight of another vinyl monomer copolymerizable with these monomers, which process is characterized in that all the amount of the aromatic vinyl monomer necessary for the entire polymerization and such partial amounts of the vinyl cyanide monomer and another copolymerizable vinyl monomer as to give a predetermined copolymer composition with respect to the content of the aromatic vinyl monomer, are first charged and emulsified and the emulsion polymerization is then initiated and carried out by adding dropwise continuously the residual amounts of the vinyl cyanide monomer and another copolymerizable vinyl monomer in such a manner that the range of change in the content of the aromatic vinyl monomer in the copolymer during the polymerization reaction will not vary more than 2% in the range of conversion of 0 to 90%; and a thermoplastic resin composition comprising

[A] 50 to 90% by weight of a copolymer constituted of 60 to 85 parts by weight of an α-alkyl-substituted aromatic vinyl monomer, 15 to 35 parts by weight of a vinyl cyanide monomer, and 0 to 40 parts by weight of another vinyl monomer copolymerizable with these monomers, the copolymer being produced in such a manner that the range of change in the content of the aromatic vinyl monomer in the copolymer during the polymerization reaction will not vary more than 2% in the range of conversion of 0 to 90, and

[B] 10 to 50% by weight of a graft copolymer constituted of 30 to 85 parts by weight of a rubber polymer and 15 to 70 parts by weight of a grafted polymer consisting of a monovinyl aromatic monomer, vinyl cyanide monomer, and another monomer copolymerizable with them in respective proportions of 85-40-:0-40:0-80, where the total amount of polymers [A] and [B] is 100% by weight.

8 Claims, 1 Drawing Sheet

CHANGE OF CONTENT OF ⍺-METHYL STYRENE IN COPOLYMER WITH CHANGE OF CONVERSION

PROCESS FOR PRODUCING AN ALPHA-ALKYL-SUBSTITUTED AROMATIC VINYL COPOLYMER AND A THERMOPLASTIC RESIN COMPOSITION COMPRISING THE COPOLYMER

This application is a continuation of application Ser. No. 204,972, filed on June 3, 1988, now abandoned, which is a continuation of application Ser. No. 06/812,895, filed on Dec. 23, 1985, now abandoned.

INDUSTRIAL APPLICATION FIELDS

The present invention relates to a process for producing copolymers of an α-alkyl-substituted aromatic vinyl compound which are superior in heat resistance and resistant to thermal decomposition and less undergo undesirable color development and thermal degradation during molding, and to a thermoplastic resin compositions wherein said copolymers are used.

PRIOR ART

Rubber-modified thermoplastic resins represented by ABS resin, AAS resin, AES resin, etc. are in wide use today as thermoplastic resins having high impact resistance.

However, the heat resistance of these resins is insufficient for use in the fields where high resistance to heat distortion is necessary, that is, the use of these resins at relatively high temperatures has been restricted. Therefore various methods have been proposed for the improvement of these resins in heat resistance. For example, Japanese Patent Publication No. 33661/70, Japanese Patent Application Laid-Open Nos. 78043/80 and 103211/81, and Japanese Patent Publication No. 60373/82 describe that the blending of α-methylstyrene-acrylonitrile copolymers with these resins provides resin compositions having superior heat resistance.

PROBLEMS TO SOLVE ACCORDING TO THE INVENTION

However, when α-alkyl-substituted aromatic vinyl copolymers are produced for the purpose of improving rubber-modified thermoplastic resins in heat resistance, the conversion cannot be raised and only copolymers having broad distribution of composition are obtainable, by simple polymerizations of mixtures of vinyl cyanides with the α-alkyl-substituted aromatic vinyl monomer. In consequence, this method permits yielding none of products but those inferior in heat resistance and impact resistance and liable to undergo thermal decomposition. The simple polymerization by dropping mixtures of the same monomers also cannot raise the conversion and can give none of copolymers but those having broad distribution of composition. Another method is known which comprises charging first an α-alkyl-substituted aromatic vinyl monomer alone, followed by dropwise addition of a vinyl cyanide monomer to copolymerize them. According to this method, the polymerization yield tends to be raised but only copolymers having broad distribution of composition are obtainable.

When such copolymers of high α-alkyl-substituted aromatic vinyl contents as mentioned above are used, tendencies are observed to frequent developments of silver streaks on the high-temperature molded products of the resulting resin blends since these copolymers are subject to thermal decomposition. When copolymers of higher vinyl cyanide contents (i.e. lower α-alkyl-substituted aromatic vinyl contents) are used for blending, marked yellowing may appear on the molded products of the resulting resin blends since such copolymers are liable to undergo undesirable color development and thermal degradation during high-temperature molding.

Accordingly it is an object of the present invention to provide a process for producing an α-alkyl-substituted aromatic vinyl copolymer which has narrow distributions of composition and polymerization degree, superior heat resistance, limited tendency to coloration during high-temperature molding, high resistance to thermal decomposition, and good processability and exhibits higher impact resistance when blended with a rubber-modified resin. It is another object of the present invention to provide a thermoplastic resin composition wherein said copolymer is used.

MEANS OF SOLVING PROBLEMS

As a result of intensive studies, the present inventors found that, in the production of a binary copolymer constituted of an α-alkyl-substituted aromatic vinyl monomer and a vinyl cyanide monomer or in the production of a terpolymer constituted of the above monomers and another monomer copolymerizable with them, a copolymer having narrow distributions of composition and polymerization degree, in which the α-alkyl-substituted aromatic vinyl content is uniform, can be obtained by emulsion polymerization while controlling the rate of dropwise addition of the vinyl cyanide monomer and the copolymerizable monomer, and that a thermoplastic resin composition superior in heat resistance is obtainable by blending said copolymer with a specific graft copolymer. Based on the finding, the present invention has been accomplished.

Thus, the first embodiment of the invention is a process for producing a copolymer constituted of 60 to 85 parts by weight of an α-alkyl-substituted aromatic vinyl monomer, 15 to 35 parts by weight of a vinyl cyanide monomer, and 0 to 40 parts by weight of another vinyl monomer copolymerizable with these monomers, characterized in that all the amount of said aromatic vinyl monomer necessary for the entire polymerization and such partial amounts of the vinyl cyanide monomer and another copolymerizable vinyl monomer as to give a predetermined copolymer composition with respect to the content of the aromatic vinyl monomer, are first charged and emulsified and the emulsion polymerization is then initiated and carried out by adding dropwise continuously the residual amounts of the vinyl cyanide monomer and another copolymerizable vinyl monomer in such a manner that the range of change in the content of said aromatic vinyl monomer in the copolymer during the polymerization reaction will not vary more than 2% in the range of conversion of 0 to 90%.

The second embodiment of the present invention is a thermoplastic resin composition comprising

[A] 50 to 90% by weight of a copolymer constituted of 60 to 85 parts by weight of an α-alkyl-substituted aromatic vinyl monomer, 15 to 35 parts by weight of a vinyl cyanide monomer, and 0 to 40 parts by weight of another vinyl monomer copolymerizable with these monomers, said copolymer being produced in such a manner that the range of change in the content of said aromatic vinyl monomer in the copolymer during the polymerization reaction will not vary more than 2% in the range of conversion of 0 to 90%, and

[B] 10 to 50% by weight of a graft copolymer constituted of 30 to 85 parts by weight of a rubbery polymer and 15 to 70 parts by weight of a polymer combination consisting of a monovinyl aromatic monomer, vinyl cyanide monomer, and another monomer copolymerizable with these monomers in respective weight proportions of 85–40: 0–40: 0–60, where the total amount of polymers [A] and [B] is 100% by weight.

DETAILED DESCRIPTION OF THE INVENTION

A matter of particular importance in the present invention is the production and use of an $\alpha$-alkyl-substituted aromatic vinyl copolymer in which the content of said monomer is uniform, that is, a copolymer having uniform or narrow distribution of composition. In other words, for the purpose of securing the high heat resistance and reducing the tendency to thermal decomposition, the production of a copolymer having a narrow distribution of composition has been accomplished by controlling the range of change in the content of the $\alpha$-alkyl-susbstituted aromatic vinyl monomer in the copolymer during the polymerization reaction to be up to 2% while the polymerization proceeds from 0 to 90%, preferably to 95%, and the copolymer produced by such a means has been used. In addition, the present invention is characterized in that the above copolymer [A] is blended with the graft copolymer [B] to prepare a thermoplastic resin composition having high heat resistance, limited tendency to thermal decomposition, and moreover good impact resistance and melt flow properties.

The copolymer obtained by the prodcution process of the present invention or used in the thermoplastic resin composition of the invention is constituted of an $\alpha$-alkyl-substituted aromatic vinyl monomer, a vinyl cyanide monomer, and if necessary, another vinyl monomer copolymerizable with them.

Suitable $\alpha$-alkyl-substituted aromatic vinyl monomers include, for example, $\alpha$-methylstyrene, $\alpha$-ethylstyrene, and $\alpha$-methylstyrene having a halogen or alkyl substituent on the ring. These monomers may be used alone or in combination, though $\alpha$-methylstyrene is preferable. Suitable vinyl cyanide monomers include, for example, acrylonitrile and methacrylonitrile, both of which may be used alone or in combination, though acrylonitrile is preferable. Suitable another vinyl monomer copolymerizable with the above monomers include; maleimide monomers, e.g. N-phenylmaleimide and maleimide; acrylic monomers, e.g. methacrylic acid, acrylic acid, methacrylic esters, and acrylic esters; and fumaronitrile and acenaphthylene. These monomers also may be used alone or in combination.

The proportions of these monomers in the copolymer are 60 to 85 parts by weight of an $\alpha$-alkyl-substituted aromatic vinyl monomer, 15 to 35 parts by weight of a vinyl cyanide monomer, and 0 to 40 parts by weight of another vinyl monomer copolymerizable with them. When the proportion of the $\alpha$-alkyl-substituted aromatic vinyl monomer is less than 60 parts by weight, the heat resistance tends to be lowered, and when the proportion exceeds 85 parts by weight, the rate of polymerization is not increased, the heat resistance is lowered, and the thermal decomposition tends to occur. When the vinyl cyanide proportion is less than 15 parts by weight, the rate of polymerization tends to be lowered, and when the proportion exceeds 35 parts by weight, the coloration and degradation are liable to take place during high-temperature molding and the heat resistance tends to lower. The another vinyl monomer is a constituent which is optionally incorporated into the copolymer. When this monomer is not added, no particular problem arises, but the addition of this monomer in an amount of up to 40 parts by weight is advantageous in that the heat resistance, melt flow properties, etc. can be further improved.

In the present invention, the intended copolymer can be obtained from the above described monomers by polymerizing them as follows: All the amount of the $\alpha$-alkyl-substituted aromatic vinyl monomer necessary for the entire polymerization is first charged together with such partial amounts of the vinyl cyanide monomer and another copolymerizable vinyl monomer as to give a predetermined copolymer composition with respect to the content of the aromatic vinyl monomer; after the charged monomers have been emulsified by thorough mixing, polymerization thereof is initiated by using an initiator; and the emulsion polymerization is carried out by adding dropwise continuously the residual amounts of the vinyl cyanide monomer and another copolymerizable vinyl monomer in such a manner that the range of change in the content of the aromatic vinyl monomer in the copolymer during the polymerization reaction will not vary more than 2% while the polymerization proceeds from 0 to 90%. Thus the intended copolymer can be obtained that has uniform or narrow distributions of composition and polymerization degree.

In other words, the intended copolymer is obtained by charging previously all the amount of the $\alpha$-alkyl-substituted aromatic vinyl monomer and partial amounts of the vinyl cyanide monomer and another copolymerizable vinyl monomer, mixing thoroughly the charged monomers to bring them to an emulsified state, and adding dropwise continuously the residual parts of the vinyl cyanide monomer and another vinyl monomer at the rates corresponding to those of their disappearance, thus carrying out the emulsion polymerization while the monomer composition in polymerization system is always maintained within a definite narrow range nearly equal to the initially charged monomer composition. When the variation in the content of the aromatic vinyl monomer exceeds 2% during 0 to 90% proceeding of polymerization, it is generally difficult to produce the copolymer having a narrow distribution of composition and superior heat resistance.

In the present invention, it is desirable to carry out the above reaction according to the emulsion polymerization process, in that this facilitates the production of a copolymer containing a high proportion of the $\alpha$-alkyl-substituted aromatic vinyl monomer.

For the purpose of achieving a higher final conversion, it is also desirable herein to conduct the polymerization with the pH of the reaction mixture being maintained within the range of 9.5 to 11.5 until the conversion reaches at least 30%.

Emulsifiers suitable for the polymerization herein include anionic and nonionic surfactants hitherto known, such as fatty acid soaps represented by (wherein, R is $C_{10}$–$C_{24}$ alkyl or alkylene and M is sodium or potassium), e.g. potassium laurate, sodium laurate, potassium myristate, sodium myristate, potassium palmitate, sodium palmitate, potassium stearate, and sodium stearate, and surfactants represented by (wherein, R is $C_{10}$–$C_{24}$ alkyl or alkylene and M is sodium or potassium). Any suitable polymerization initiator and chain transfer agent hitherto known can also be used for the polymerization. The polymerization is carried out usually between room temperature and 95° C., preferably between 40° and 85° C., for a period of 2 to 6 hours. After completion of the polymerization, a powder of the intended copolymer can be obtained by coagulation in the normal way.

On the other hand, the graft copolymer [B] used in the present invention is constituted of a rubbery polymer, monovinyl aromatic monomer, vinyl cyanide monomer, and another monomer copolymerizable with these monomers.

The term "rubbery polymer" used herein means a diene rubber constituted mainly of diene monomer (e.g. polybutadiene, polyisoprene, or butadiene-styrene copolymer), acrylic rubber constituted mainly of acrylate (e.g. an acrylic rubber constituted mainly of butyl acrylate), or ethylene-propylene-diene rubber (EPDM). However, the rubbery polymer used herein is not particularly limited to the above-cited rubber. These rubbers may be used alone or in combination. Examples of the monovinyl aromatic monomer include styrene, α-methylstyrene, chlorostyrene, and tertbutylstyrene, of which styrene and α-methylstyrene are preferred. These monomers also may be used alone or in combination.

The vinyl cyanide monomer is, for example, acrylonitrile, methacrylonitrile or preferably acrylonitrile. These monomers also may be used alone or in combination. Examples of the monomer copolymerizable with the above monomers include; maleimide monomers such as N-phenylmaleimide and maleimide; acrylic monomers such as methacrylic acid, acrylic acid, methacrylic esters, and acrylic esters; and fumaronitrile and acenaphthylene. These monomers also may be used alone or in combination.

The proportions of these constituents in the graft copolymer are 30 to 85 parts by weight of the rubbery polymer and 15 to 70 parts by weight of a polymer combination consisting of the monovinyl aromatic monomer, vinyl cyanide monomer, and another monomer copolymerizable with these monomers in respective weight proportions of 85–40 : 0–40 : 0–60. When the proportion of the rubbery polymer is less than 30 parts by weight, the impact resistance tends to be deteriorated, and when the proportion of the rubbery polymer exceeds 85 parts by weight, the good heat resistance may be hardly attained and the processability tends to be deteriorated. When the total proportion of the monovinyl aromatic monomer, vinyl cyanide monomer, and another monomer copolymerizable with them is less than 15 parts by weight, the processability tends to be deteriorated, and when the total proportion monovinyl aromatic monomer, vinyl cyanide monomer, and another monomer copolymerizable with them exceeds 70 parts by weight, the impact resistance is generally lowered. When any of the proportions of these monomers is out of the above defined range, it will be difficult to obtain the intended thermoplastic resin composition of the present invention.

The graft polymerization is carried out under the known reaction condition by the conventional method.

The graft copolymer [B], which has been described above, is produced by emulsion or solution polymerization, but the production method is not limited to these.

In the present invention, dried powders of the thus obtained copolymer [A] and graft copolymer [B] are blended in a Henschel mixer, kneaded by using a vented extruder, Banbury mixer, or roller mill, and pelletized, thereby yielding the intended thermoplastic resin composition that has superior heat resistance, limited tendecies to thermal decomposition and to color development and thermal degradation during molding and superior impact resistance and superior melt flow properties.

EXAMPLES

The following examples illustrate the present invention in more detail. In the examples, parts are by weight. The thermal decomposition properties, color development during molding, and content of α-methylstyrene in the polymer sample were measured in the following ways:

(1) Thermal decomposition properties and color development during molding

Plates were molded by injecting a sample of thermoplastic resin compositions at 230° C. and 290° C. using a 1 oz. injection molding machine. Contents (% by weight) of α-methylstyrene remaining in the plates were measured by gas chromatography, and the thermal decomposition properties of the sample was determined from the difference (% by weight) between the contents in the plates injected at 290° C. and 230° C. The degree of yellowing (YI value, measured in accordance with JIS-K-7103) of the plate injected at 290° C. was determined to examine the thermal coloration and degradation.

(2) Content of α-methylstyrene in copolymer

The acrylonitrile content in a copolymer sample recovered by coagulation with isopropanol was determined according to the micro-Kjeldahl method, and the remainder was regarded as the α-methylstyrene content.

EXAMPLES 1–5

Preparation of copolymer [A]

The following materials were charged in a 5-liter reactor equipped with a stirrer.

| Materials: | |
|---|---|
| Water | 250 parts |
| Dextrose | 0.5 part |
| Ferrous sulfate (FeSO$_4$.7H$_2$O) | 0.003 part |
| Sodium pyrophosphate | 0.1 part |
| Potassium palmitate | 3 parts |

The charged materials were heated with stirring at 60° C. under a stream of nitrogen gas. Thereto was further charged each of five different monomer compositions (I) (containing a chain transfer agent) as shown in Table 1. After sufficient emulsification of the mixture, 0.3 part of cumene hydroperoxide was added and then each of five different amounts of a monomer (II) (each containing a polymerization initiator) was continuously added dropwise over 3 hours. After this addition, stirring was further continued for 1.5 hours to complete the polymerization. The resulting copolymer latex was coagulated with a 1% aqueous magnesium sulfate solution. The coagulum was washed and dried to yield a white powder.

Each of the thus obtained white powder was extruded at a resin temperature of 270° C. to form pellets, which were used to evaluate fundamental properties such as heat resistance, impact resistance, and melt flow property, and tendencies to thermal decomposition and to thermal coloration during molding. Results of the evaluation are shown in Table 1.

Figure 1:
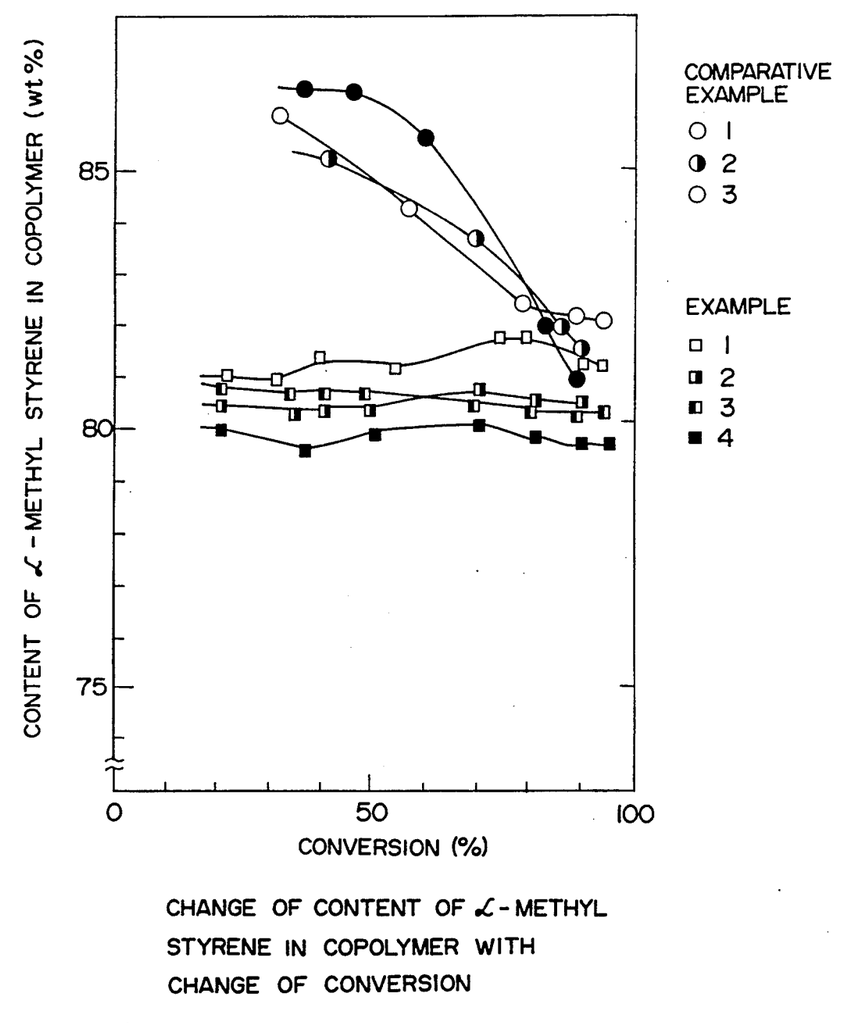
The drawing illustrates the relation between the α-methylstyrene (MS) content in the latex polymer and the conversion, both being measured during polymerization on each of examples and comparative examples.

On the other hand, the latex under polymerization was sampled successively and the composition and the conversion were determined as functions of time passage. Results thereof are shown in the accompanying drawing. As evident from the drawing, the five copolymers produced by the above polymerizations were all found to have narrow distribution of composition, that is, the α-methylstyrene content was uniform in each copolymer.

Preparation of graft copolymer [B]

(B-1) Resin modified with diene rubber

The following materials were charged in a reactor equipped with a stirrer.

| Materials: | |
|---|---|
| Water | 140 parts |
| Dextrose | 0.3 part |
| Ferrous sulfate (FeSO$_4$.7H$_2$O) | 0.005 part |
| Sodium pyrophosphate | 0.2 part |
| Polybutadiene | 60 parts |

The charged materials were heated with stirring to 60° C. under a stream of nitrogen gas, and then 28 parts of styrene, 12 parts of acrylonitrile, and 0.3 part of cumene hydroperoxide were added dropwise simultaneously and continuously over 2 hours. Thereafter, stirring was further continued for 1 hour to complete the polymerization. After addition of 2 parts of butylated hydroxytoluene as an antioxidant, the resulting latex was coagulated with 5% sulfuric acid, washed, and dried to yield a white powder of graft copolymer (B-1).

(B-2) Resin modified with acrylic rubber (A) Preparation of crosslinked resin latex 200 Parts of deionized water was placed in a reactor, in which the air was then replaced with nitrogen gas and the water was heated to 80° C. After addition of 0.06 part of potassium persulfate to the water, the following mixture was injected continuously thereinto over 30 minutes.

| Mixture: | |
|---|---|
| Methyl methacrylate (MMA) | 24 parts |
| Acrylonitrile (AN) | 24 parts |
| Styrene (St) | 7.2 parts |
| Triallyl isocyanurate (TAIC) | 0.06 part |

| -continued | |
|---|---|
| Mixture: | |
| Pelex OTP (Trade name, emulsifier) | 0.3 part |

The exothermic reaction finished about 1 hour after completion of the injection. The resulting crosslinked resin latex was found to have an average particle diameter of 0.26 μm.

(B) Preparation of crosslinked acrylic rubber having multiphase structure

After 0.24 part of potassium persulfate had been supplemented to the crosslinked resin latex obtained in (A), the following mixture was continuously injected thereinto over 2 hours.

| Mixture: | |
|---|---|
| n-Butyl acrylate (BuA) | 43.2 parts |
| AN | 4.8 parts |
| TAIC | 0.24 part |
| Pelex OTP (Trade name, emulsifier) | 0.30 part |

The thus obtained crosslinked acrylic rubber particles having each a core of the above crosslinked resin showed a degree of swelling of 80, gel content of 90%, and average diameter of 0.30 μm. The degree of swelling (DS) herein was calculated according to the representation DS=$W_2/W_1$, wherein $W_1$(g) is the initial weight (0.5 g in practice) of the sample and $W_2$(g) is the weight of the swelled sample resulting from the immersion of the initial sample in 50 ml of toluene at room temperature for 48 hours and filtering the sample on a 100-mesh screen. The gel content (GC) was calculated according to the representation GC(%)=($W_3/W_1$)×100% wherein $W_1$ is the above initial weight of the sample and $W_3$(g) is the weight of the sample resulting from drying the above swelled sample (weight: $W_2$g) in vacuo for 24 hours.

(C) Preparation of graft copolymer

The following mixture was injected into the crosslinked acrylic rubber latex obtained in (B) above.

| Mixture: | |
|---|---|
| MMA | 8 parts |
| AN | 8 parts |
| St | 24 parts |
| n-Octyl mercaptan | 0.04 part |
| Benzoyl persulfate | 0.20 part |

The thus obtained latex was coagulated by pouring into an aqueous calcium chloride solution (5 times the volume of the latex) with stirring. Then the coagulum was dehydrated, washed, and dried to yield a graft copolymer (B-2) of high rubber content.

Portions of the obtained graft copolymers (B-1) and (B-2) were mixed severally with each of the above five copolymers [A] in weight ratios as shown in Table 2 by using a Henschel mixer. Each of the mixtures was extruded at a resin temperature of 270° C. to form pellets, which were used to evaluate fundamental properties such as heat resistance, impact resistance, and melt flow property, and tendencies to thermal decomposition and to thermal coloration during molding. Results of the evaluation are shown in Table 2.

As evident from Table 2, the copolymers according to the present invention are superior in heat resistance, thermal decomposition resistance, melt flow property, impact resistance, and resistance to thermal coloration during molding.

COMPARATIVE EXAMPLE 1

The following materials were charged in a 5-liter reactor equipped with a stirrer.

| Materials: | |
| --- | --- |
| Water | 250 parts |
| Dextrose | 0.5 part |
| Ferrous sulfate (FeSO$_4$.7H$_2$O) | 0.003 part |
| Sodium pyrophosphate | 0.1 part |
| Potassium palmitate | 3 parts |

The charged materials were heated with stirring to 60° C. under a stream of nitrogen gas, and 80 parts of α-methylstyrene was further charged. After sufficient emulsification of the mixture, 20 parts of acrylonitrile and 0.5 part of cumene hydroperoxide were added dropwise at constant rates over 4 hours. After this addition, stirring was further continued for 2 hours to complete the polymerization. The resulting copolymer latex was coagulated with a 1% aqueous magnesium sulfate solution, washed and dried to yield a white powder.

The thus obtained white powder was extruded at a resin temperature of 270° C. to form pellets, which were used to evaluate the above-mentioned fundamental properties and tendencies to thermal decomposition and to thermal coloration. Results of the evaluation are also shown in Table 1.

On the other hand, the latex under polymerization was sampled, and the composition and the conversion were determined. Results thereof are shown in the drawing. In addition, a portion of the graft copolymer (B-1) prepared in Example 1 and the copolymer of this comparative example were blended together in a weight ratio of 25:75 and further mixed in a Henschel mixer. This mixture was extruded at a resin temperature of 270° C. to form pellets, which were used to evaluate the above-mentioned fundamental properties and tendencies to thermal decomposition and to thermal coloration. Results of the evaluation are also shown in Table 2.

COMPARATIVE EXAMPLE 2

The following materials were charged in a 5-liter reactor equipped with a stirrer.

| Materials: | |
| --- | --- |
| Water | 250 parts |
| Dextrose | 0.5 part |
| Ferrous sulfate (FeSO$_4$.7H$_2$O) | 0.003 part |
| Sodium pyrophosphate | 0.1 part |
| Potassium palmitate | 5 parts |

The charged materials were heated with stirring to 60° C. under a stream of nitrogen gas, and 24 parts of α-methylstyrene and 2.4 parts of acrylonitrile were further charged. To this mixture was added 0.3 part of cumene hydroperoxide and the polymerization was conducted for 1 hour. Then 56 parts of α-methylstyrene and 5.6 parts of acrylonitrile were added dropwise continuously to the polymerization mixture over 3 hours. Thereafter 12 parts of acrylonitrile was added dropwise continuously for 1 hour for the purpose of increasing the yield. After this addition, stirring was further continued for 3 hours to complete the polymerization. The resulting copolymer latex was coagulated with a 1% aqueous magnesium sulfate solution, washed, and dried to yield a white powder.

The thus obtained white powder was extruded at a resin temperature of 270° C. to form pellets, which were used to evaluate the above-mentioned fundamental properties and tendencies to thermal decomposition and to thermal coloration. Results of the evaluation are also shown in Table 1.

On the other hand, the latex under polymerization was sampled, and the composition and the conversion were determined. Results thereof are shown in the drawing. In addition, a portion of the graft copolymer (B-1) prepared in Example 1 and the copolymer of this comparative example were blended together in a weight ratio of 25:75 and further mixed in a Henschel mixer. The mixture was extruded at a resin temperature of 270° C. to form pellets, which were used to evaluate the above-mentioned fundamental properties and tendencies to thermal decomposition and to thermal coloration. Results of the evaluation are also shown in Table 2.

COMPARATIVE EXAMPLE 3

The following materials were charged in a 5-liter ractor equipped with a stirrer.

| Materials: | |
| --- | --- |
| Water | 250 parts |
| Dextrose | 0.5 part |
| Ferrous sulfate (FeSO$_4$.7H$_2$O) | 0.003 part |
| Sodium pyrophosphate | 0.1 part |
| Potassium palmitate | 5 parts |

The charged materials were heated with stirring to 60° C. under a stream of nitrogen gas, and 80 parts of α-methylstyrene, 8 parts of acrylonitrile, and 0.4 part of cumene hydroperoxide were added dropwise continuously over 6 hours, and for the purpose of increasing the yield, 12 parts of acrylonitrile was then added dropwise for 1 hour. After this addition, stirring was further continued for 3 hours to complete the polymerization. The resulting copolymer latex was coagulated with a 1% aqueous magnesium sulfate solution, washed, and dried to yield a white powder.

The thus obtained white powder was extruded at a resin temperature of 270° C. to form pellets, which were used to evaluate the above-mentioned fundamental properties and tendencies to thermal decomposition and to thermal coloration. Results of the evaluation are also shown in Table 1.

On the other hand, the latex under polymerization was sampled, and the composition and the conversion were determined. Results thereof are shown in the drawing. In addition, a portion of the graft copolymer (B-1) prepared in Example 1 and the copolymer of this comparative example were blended together in weight ratio of 25:75 and further mixed in a Henschel mixer. This mixture was extruded at a resin temperature of 270° C. to form pellets, which were used to evaluate the above-mentioned fundamental properties and tendencies to thermal decomposition and to thermal coloration. Results of the evaluation are also shown in Table 2.

TABLE 1

|  |  | Example No. |  |  |  |  | Comparative Example No. |  |  |
|---|---|---|---|---|---|---|---|---|---|
|  |  | 1 | 2 | 3 | 4 | 5 | 1 | 2 | 3 |
| Monomer composition I | α-Methylstyrene (part) | 80 | 78 | 78 | 76 | 76 |  |  |  |
|  | Acrylonitrile (part) | 9 | 8 | 9 | 10 | 10 |  |  |  |
|  | Cumene hydroperoxide (part) | 0.3 | 0.3 | 0.3 | 0.3 | 0.3 |  |  |  |
|  | t-Dodecyl mercaptane (part) | 0.15 | 0.15 | 0.15 | 0.15 | 0.15 |  |  |  |
| Monomer composition II | α-Methylstryene (part) | — | — | — | — | — |  |  |  |
|  | Acrylonitrile (part) | 11 | 14 | 13 | 14 | 14 |  |  |  |
|  | Cumene hydroperoxide (part) | 0.1 | 0.1 | 0.1 | 0.1 | 0.1 |  |  |  |
|  | t-Dodecyl mercaptan (part) | — | — | — | — | — |  |  |  |
| Graft copolymer [B] (designation) |  |  | B-1 |  |  | B-2 |  | B-1 |  |
| Izod impact strength, notched, ASTM D-256 (kg.cm/cm$^2$) |  | 2.3 | 2.7 | 2.7 | 2.9 | 2.9 | 1.9 | 2.2 | 2.3 |
| Melt flow index, ASTM D-1238 (g/10 min) |  | 0.13 | 0.15 | 0.16 | 0.21 | 0.21 | 0.09 | 0.11 | 0.13 |
| Vicat softening temperature, ISO R-306 (°C.) |  | 139 | 137 | 137 | 134 | 134 | 130 | 125 | 123 |
| Thermal decomposition |  | 0.55 | 0.41 | 0.45 | 0.22 | 0.22 | 0.85 | 0.29 | 0.23 |
| Coloration-degradation during molding (yellowness index) |  | 21 | 25 | 24 | 29 | 29 | 22 | 42 | 44 |

TABLE 2

|  |  | Example No. |  |  |  |  | Comparative Example No. |  |  |
|---|---|---|---|---|---|---|---|---|---|
|  |  | 1 | 2 | 3 | 4 | 5 | 1 | 2 | 3 |
| Monomer composition I | α-Methylstyrene (part) | 80 | 78 | 78 | 76 | 76 |  |  |  |
|  | Acrylonitrile (part) | 9 | 8 | 9 | 10 | 10 |  |  |  |
|  | Cumene hydroperoxide (part) | 0.3 | 0.3 | 0.3 | 0.3 | 0.3 |  |  |  |
|  | t-Dodecyl mercaptane (part) | 0.15 | 0.15 | 0.15 | 0.15 | 0.15 |  |  |  |
| Monomer composition II | α-Methylstyrene (part) | — | — | — | — | — |  |  |  |
|  | Acrylonitrile (part) | 11 | 14 | 13 | 14 | 14 |  |  |  |
|  | Cumene hydroperoxide (part) | 0.1 | 0.1 | 0.1 | 0.1 | 0.1 |  |  |  |
|  | t-Dodecyl mercaptan (part) | — | — | — | — | — |  |  |  |
| Graft copolymer [B] (designation) |  |  | B-1 |  |  | B-2 |  | B-1 |  |
| Weight ratio (copolymer [A]/graft copolymer [B]) |  |  | 75/25 |  |  | 60/40 | 75/25 | 75/25 | 75/25 |
| Izod impact strength, notched, ASTM D-256 (kg.cm/cm$^2$) |  | 11 | 13 | 13 | 15 | 8 | 8 | 10 | 12 |
| Melt flow index, ASTM D-1238 (g/10 min) |  | 0.12 | 0.14 | 0.14 | 0.17 | 0.15 | 0.07 | 0.10 | 0.14 |
| Vicat softening temperature, ISO R-306 (°C.) |  | 128 | 126 | 125 | 123 | 112 | 120 | 116 | 113 |
| Thermal decomposition |  | 0.41 | 0.32 | 0.33 | 0.15 | 0.14 | 0.62 | 0.21 | 0.15 |
| Coloration-degradation during molding (yellowness index) |  | 35 | 40 | 40 | 45 | 40 | 38 | 55 | 58 |

EXAMPLES 6–9

White powdery copolymers [A] were prepared by following the procedure of Example 1 but using 3 parts each of potassium laurate, potassium myristate, potassium stearate, and a surfactant [I] of the formula wherein R is a mixture of $C_{16}$–$C_{18}$ alkyls, as emulsifier in place of potassium palmitate. In each of these copolymers, the distribution of composition was narrow, that is, the content of α-methylstyrene was uniform.

Each of the thus obtained white powdery copolymers [A] was extruded at a resin temperature of 270° C. to form pellets, which were used to evaluate the above-mentioned fundamental properties and tendencies to thermal decomposition and to thermal coloration. Results of the evaluation are shown in Table 3.

In the next place, a portion of the graft copolymer (B-1) prepared in Example 1 and each of these copolymers [A] were blended together in a weight ratio of 25:75 and further mixed in a Henschel mixer. Each mixture was extruded at a resin temperature of 270° C. to form pellets, which were used to evaluate, similarly to Example 1, the above-mentioned fundamental properties and tendecies to thermal decomposition and to thermal coloration. Results of the evaluation are shown in Table 4.

TABLE 3

|  | Example No. | | | |
|---|---|---|---|---|
|  | 6 | 7 | 8 | 9 |
| Emulsifier (parts) | Potassium laurate | Potassium myristate | Potassium stearate 3 | Surfactant [I] |

TABLE 3-continued

|  |  | Example No. | | | |
|---|---|---|---|---|---|
|  |  | 6 | 7 | 8 | 9 |
| Monomer composition I | α-Methylstyrene (part) | | | 80 | |
|  | Acrylonitrile (part) | | | 9 | |
|  | Cumene hydroperoxide (part) | | | 0.3 | |
|  | t-Dodecyl mercaptan (part) | | | 0.15 | |
| Monomer composition II | α-Methylstyrene (part) | | | — | |
|  | Acrylonitrile (part) | | | 11 | |
|  | Cumene hydroperoxide (part) | | | 0.1 | |
|  | t-Dodecyl mercaptan (part) | | | — | |
| Graft copolymer [B] (designation) | | | | B-1 | |
| Izod impact strength, notched, ASTM D-256 (Kg.cm/cm$^2$) | | 2.3 | 2.1 | 2.2 | 2.3 |
| Melt flow index, ASTM D-1238 (g/10 min) | | 0.14 | 0.14 | 0.13 | 0.13 |
| Vicat softening temperature, ISO R306 (°C.) | | 140 | 139 | 139 | 140 |
| Thermal decomposition | | 0.57 | 0.55 | 0.54 | 0.60 |
| Coloration during molding (yellowness index) | | 21 | 20 | 20 | 21 |

TABLE 4

|  |  | Example No. | | | |
|---|---|---|---|---|---|
|  |  | 6 | 7 | 8 | 9 |
| Emulsifier (parts) |  | Potassium laurate | Potassium myristate 3 | Potassium stearate | Surfactant [I] |
| Monomer composition I | α-Methylstyrene (part) | | | 80 | |
|  | Acrylonitrile (part) | | | 9 | |
|  | Cumene hydroperoxide (part) | | | 0.3 | |
|  | t-Dodecyl mercaptan (part) | | | 0.15 | |
| Monomer composition II | α-Methylstyrene (part) | | | — | |
|  | Acrylonitrile (part) | | | 11 | |
|  | Cumene hydroperoxide (part) | | | 0.1 | |
|  | t-Dodecyl mercaptan (part) | | | — | |
| Graft copolymer [B] (designation) |  | | | B-1 | |
| Weight ratio (copolymer [A]/graft copolymer [B]) |  | | | 75/25 | |
| Izod impact strength, notched, ASTM D-256 (kg.cm/cm$^2$) |  | 11 | 11 | 11 | 12 |
| Melt flow index, ASTM D-1238 (g/10 min) |  | 0.13 | 0.12 | 0.12 | 0.12 |
| Vicat softening temperature, ISO R306 (°C.) |  | 128 | 128 | 127 | 128 |
| Thermal decomposition |  | 0.44 | 0.42 | 0.40 | 0.45 |
| Coloration during molding (yellowness index) |  | 36 | 35 | 35 | 37 |

EXAMPLE 10

The following materials were charged in a 5-liter reactor equipped with a stirrer.

| Materials: | |
|---|---|
| Water | 200 parts |
| Potassium laurate | 2.5 parts |
| Dextrose | 0.5 part |
| Ferrous sulfate (FeSO$_4$.7H$_2$O) | 0.005 part |
| Sodium pyrophosphate | 0.1 part |

The pH of contents in the reactor was initially 10.0, and an addition of 0.01 part of potassium hydroxide, rose to 10.8.

The charged mixture was then heated with stirring to 60° C. under a stream of nitrogen gas, and further 80 parts of α-methylstyrene and 9 parts of acrylonitrile were charged and thoroughly emulsified. Thereafter, 0.5 part of cumene hydroperoxide was added and then 11 parts of acrylonitrile and 0.1 part of cumene hydroperoxide were added dropwise continuously over 3 hours. During this addition, the conversion and the pH of the reaction mixtures were measured at suitable times and, as described below, the pH was controlled by adding potassium hydroxide.

That is, the pH of the reaction mixture reached 9.5 at a conversion of 10%, and hence 0.01 part of potassium hydroxide dissolved in 0.5 part of water was added to raise the pH to 10.4. At a conversion of 18%, the pH reached 9.6 and hence the same potassium hydroxide solution as above was added to raise the pH to 0.4. At a conversion of 27%, the pH reached 9.5 and hence the same potassium hydroxide solution as above was added to raise the pH to 10.3. The pH was 10.0 at a conversion of 30%.

After addition of acrylonitrile had been finished, stirring was further continued for 1 hour at 60° C. to complete the polymerization. The final conversion was 97%.

The resulting copolymer latex was coagulated with a 1% aqueous magnesium sulfate solution; washed, and dried to yield a white powdery copolymer.

The Ph and intermediate and final conversion were measured as follows:

Measurement of pH

The pH was measured by colorimetry using test paper prepared by impregnating filter paper with each of the following indicators:

|  | Range of pH measurable |
| --- | --- |
| Phenol red | 6.8–8.4 |
| Thymol blue | 8.0–9.6 |
| Phenolphthalein-Thymolphthalein mixture | 9.6–10.0 |
| Nile blue | 10.0–11.0 |
| Alizarin yellow R | 10.2–12.0 |
| Tropaeolin O | 11.0–13.0 |

Intermediate conversion

This was calculated from the quantity of solids which were obtained by withdrawing a sample of the latex during polymerization and then coagulating the sample latex with isopropanol.

Final conversion

This was calculated from the quantity of remaining monomers determined by gas chromatography. The thus obtained white powdery copolymer was extruded at a resin temperature of 270° C. to form pellets, which were measured, similarly to Example, for the fundamental properties and thermal decomposition and thermal coloration tendencies. Results of the measurement were as follows:

| Izod impact strength, notched | 2.3 kg.cm/cm$^2$ |
| --- | --- |
| Melt flow index | 0.13 g/10 min |
| Vicat softening temperature | 140° C. |
| Thermal decomposition tendency | 0.60 |
| Yellowness index | 21 |

In the next place, the thus obtained copolymer and a portion of the graft copolymer (B-1) obtained in Example 1 were blended together in a weight ratio of 75:25 and further mixed in a Henschel mixer. This mixture was extruded at a resin temperature of 270° C. to form pellets, which were measured, similarly to Example 1, for the fundamental properties and thermal decomposition and thermal coloration tendencies. Results of the measurement were as follows:

| Izod impact strength, notched | 12 kg.cm/cm$^2$ |
| --- | --- |
| Melt flow index | 0.13 g/10 min |
| Vicat softening temperature | 128° C. |
| Thermal decomposition tendency | 0.41 |
| Yellowness index | 35 |

EFFECT OF THE INVENTION

According to the present invention, copolymers uniform in the α-alkyl-substituted aromatic vinyl content, that is, having uniform or narrow distribution of composition, can be obtained by very simple procedure. Additionally the obtained copolymers of α-alkyl-substituted aromatic vinyl are superior in heat resistance and processability and have limited tendencies to coloration during high-temperature molding and to thermal decomposition. Furthermore these copolymers on blending with a specific rubber-modified resin provide resin compositions having higher impact resistance, better processability, excellent heat resistance and thermal decomposition resistance and limited tendencies to coloration during high-temperature molding.

What is claimed is:

1. A thermoplastic composition comprising
   [A] 50 to 90% by weight of a copolymer comprising 60 to 85 parts by weight of an α-alkyl-substituted aromatic vinyl monomer, 15 to 35 parts by weight of a vinyl cyanide monomer, and 0 to 40 parts by weight of another vinyl monomer copolymerizable with these monomers, said copolymer being produced by a process comprising:
   (1) all the amount of said aromatic vinyl monomer necessary for the entire polymerization and such partial amounts of the vinyl cyanide monomer and another copolymerizable vinyl monomer as to give a desired copolymer composition with respect to the content of said aromatic vinyl monomer, are first charged into a reaction vessel containing emulsifying agents,
   (2) the charged monomers are emulsified by thorough mixing,
   (3) emulsion polymerization is then initiated by adding polymerization initiator, and there is continuously added dropwise a solution of the residual amount of the vinyl cyanide monomer, another copolymerizable vinyl monomer and polymerization initiator, in such a manner that the range of change in the content of said aromatic vinyl monomer in said copolymer during the polymerization reaction will not vary more than 2% in the range of conversion of up to 90%, and
   [B] 10 to 50% by weight of a graft copolymer comprising 30 to 85 parts by weight of a rubbery polymer and 15 to 70 parts by weight of a polymer combination consisting of a monovinyl aromatic monomer, vinyl cyanide monomer, and another monomer copolymerizable with these monomers in respective weight proportions of 84–40 : 0–40 : 0–60,
   where the total amount of polymers [A] and [B] is 100% by weight.

2. The thermoplastic resin composition according to claim 1, wherein the α-alkyl-substituted aromatic vinyl monomer constituting the copolymer [A] is α-methylstyrene.

3. The thermoplastic resin composition according to claim 1, wherein the vinyl cyanide monomer constituting the copolymer [A] is acrylonitrile.

4. The thermoplastic resin composition according to claim 1, the copolymer [A] of which is produced while the pH in the polymerization system is maintained within the range of 9.5 to 11.5 until the conversion reaches at least 30%.

5. The thermoplastic resin composition according to claim 1, the copolymer [A] of which is produced by using a surfactant represented by the formula , wherein R is $C_{10}$–$C_{24}$ alkyl or alkylene and M is sodium or potassium, as an emulsifier for the polymerization.

6. The thermoplastic resin composition according to claim 1 the copolymer [A] of which is produced by using a surfactant represented by the formula , wherein R is $C_{10}$–$C_{24}$ alkyl or alkylene and M is sodium or potassium, as an emulsifier for the polymerization.

7. The thermoplastic resin composition according to claim 1, wherein the monovinyl aromatic monomer constituting the copolymer [B] is styrene or α-methylstyrene.

8. The thermoplastic resin composition according to claim 1, wherein the vinyl cyanide monomer constituting the copolymer [B] is acrylonitrile.

* * * * *